(12) United States Patent
Matsuno

(10) Patent No.: US 8,543,300 B2
(45) Date of Patent: Sep. 24, 2013

(54) VEHICLE BEHAVIOR CONTROL APPARATUS

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 43 days.

(21) Appl. No.: 13/225,731

(22) Filed: Sep. 6, 2011

(65) Prior Publication Data

US 2012/0065850 A1 Mar. 15, 2012

(30) Foreign Application Priority Data

Sep. 10, 2010 (JP) .................................. 2010-203398

(51) Int. Cl.
- *G06F 7/70* (2006.01)
- *G06F 19/00* (2011.01)
- *G06G 7/00* (2006.01)
- *G06G 7/76* (2006.01)

(52) U.S. Cl.
USPC ............................................. 701/53; 701/89

(58) Field of Classification Search
USPC ............... 701/51, 66, 96; 475/120; 477/153; 123/352; 180/179
See application file for complete search history.

(56) References Cited

U.S. PATENT DOCUMENTS

| | | | | |
|---|---|---|---|---|
| 4,754,403 A | * | 6/1988 | Hiramatsu | 701/66 |
| 7,353,185 B2 | * | 4/2008 | Fuyama | 705/13 |
| 7,562,948 B2 | * | 7/2009 | Matsumoto et al. | 303/146 |
| 7,681,960 B2 | * | 3/2010 | Wanke et al. | 303/146 |
| 7,784,577 B2 | * | 8/2010 | Yoneda | 180/197 |
| 8,027,775 B2 | * | 9/2011 | Takenaka et al. | 701/70 |
| 8,050,822 B2 | * | 11/2011 | Takenaka et al. | 701/41 |
| 8,135,528 B2 | * | 3/2012 | Takenaka et al. | 701/72 |
| 2002/0018005 A1 | * | 2/2002 | Fuyama | 340/928 |
| 2002/0145541 A1 | * | 10/2002 | Matsui et al. | 340/934 |
| 2002/0169538 A1 | * | 11/2002 | Yamamura et al. | 701/96 |
| 2009/0043465 A1 | * | 2/2009 | Tomita | 701/51 |
| 2010/0250083 A1 | * | 9/2010 | Takahashi et al. | 701/70 |
| 2012/0221228 A1 | * | 8/2012 | Noumura et al. | 701/110 |

FOREIGN PATENT DOCUMENTS

JP 2002-46589 A 2/2002

* cited by examiner

*Primary Examiner* — Thomas Black
*Assistant Examiner* — Robert Payne
(74) *Attorney, Agent, or Firm* — McDermott Will & Emery LLP

(57) ABSTRACT

An engine driving force is calculated. A first-lag process is executed based upon the engine driving force to calculate an engaging torque between front and rear shafts. The resultant is output to a transfer clutch drive unit. A braking force according to a change of a driving force, which is decreased with the lapse of time based upon a temporal change of the engine driving force, is calculated by executing a first-order lead process. An acceleration sensitive target yaw moment based upon the braking force according to the change of the driving force is calculated, and a steering sensitive target yaw moment based upon a steering angle velocity is calculated by executing the first-order lead process. A braking force to be added to an inner wheel on a turn is calculated based upon these target yaw moment. The resultant is output to a brake drive unit.

8 Claims, 5 Drawing Sheets

VEHICLE BEHAVIOR CONTROL APPARATUS

CROSS-REFERENCE TO RELATED APPLICATIONS

The present application claims priority from Japanese Patent Application No. 2010-203398 filed on Sep. 10, 2010, the entire contents of which are hereby incorporated by reference.

BACKGROUND OF THE INVENTION

1. Field of the Invention

The present invention relates to a vehicle behavior control apparatus having a longitudinal driving force distribution control, for controlling an engaging torque between front and rear shafts, and a braking force control for adding a braking force to a set wheel, the apparatus allowing these controls to be appropriately executed in cooperation with each other.

2. Description of Related Art

Japanese Patent Application Laid-Open (JP-A) No. 2002-46589 describes a vehicle having a longitudinal driving force distribution control for controlling an engaging torque between front and rear shafts and a braking force control for adding a braking force to a set wheel. In this apparatus, the braking control is inhibited while the connection state between the front and rear shafts is tight, even when a condition of starting the braking control by a brake control apparatus is established. On the other hand, during the execution of the braking control by the brake control apparatus, the braking control by the brake control apparatus is continued, even when the connection state between the front and rear shafts is changed to become tight, and the change in the connection state between the front and rear shafts is limited.

When the front and rear shafts are engaged with the vehicle in a head-out state during a turn, an understeer tendency' is increased by a difference of a lotus between the front shaft and the rear shaft (=difference in slip ratio=front-wheel-brake/rear-wheel-drive state). When the brake control is inhibited in this condition as in Japanese Patent. Application Laid-Open (JP-A) No. 2002-16589, a sufficient steering response cannot be expected. On the contrary, when the change in the longitudinal driving force distribution control is limited in a case where the brake control is executed earlier, as in Japanese Patent Application Laid-Open (JP-A) No. 2002-46589, a sufficient traction performance cannot be obtained. As described above, it is difficult to appropriately attain both the steering response and the traction performance only by switching the independent longitudinal driving force distribution control and the brake control.

SUMMARY OF THE INVENTION

The present invention is accomplished in view of the above-mentioned circumstances, and aims to provide a vehicle behavior control apparatus that can appropriately attain both a steering response and a traction performance by the cooperation of a longitudinal driving force distribution control and a brake control.

The present invention provides a vehicle behavior control apparatus including: a longitudinal driving force distribution control unit configured to control an engaging torque between a front shaft and a rear shaft according to a vehicle motion state; and a braking force control unit configured to add a braking force to a wheel, the braking force being set according to a driving state of the vehicle, wherein the engagement between the front shaft and the rear shaft by the longitudinal driving force distribution control unit is executed later than the addition of the braking force by the braking force control unit.

The vehicle behavior control apparatus according to the present invention can appropriately attain both a steering response and a traction performance by the cooperation of a longitudinal driving force distribution control and a brake control.

DETAILED DESCRIPTION OF THE PREFERRED EMBODIMENTS

An embodiment of the present invention will explained in detail below with reference to the drawings.

Figure 1:
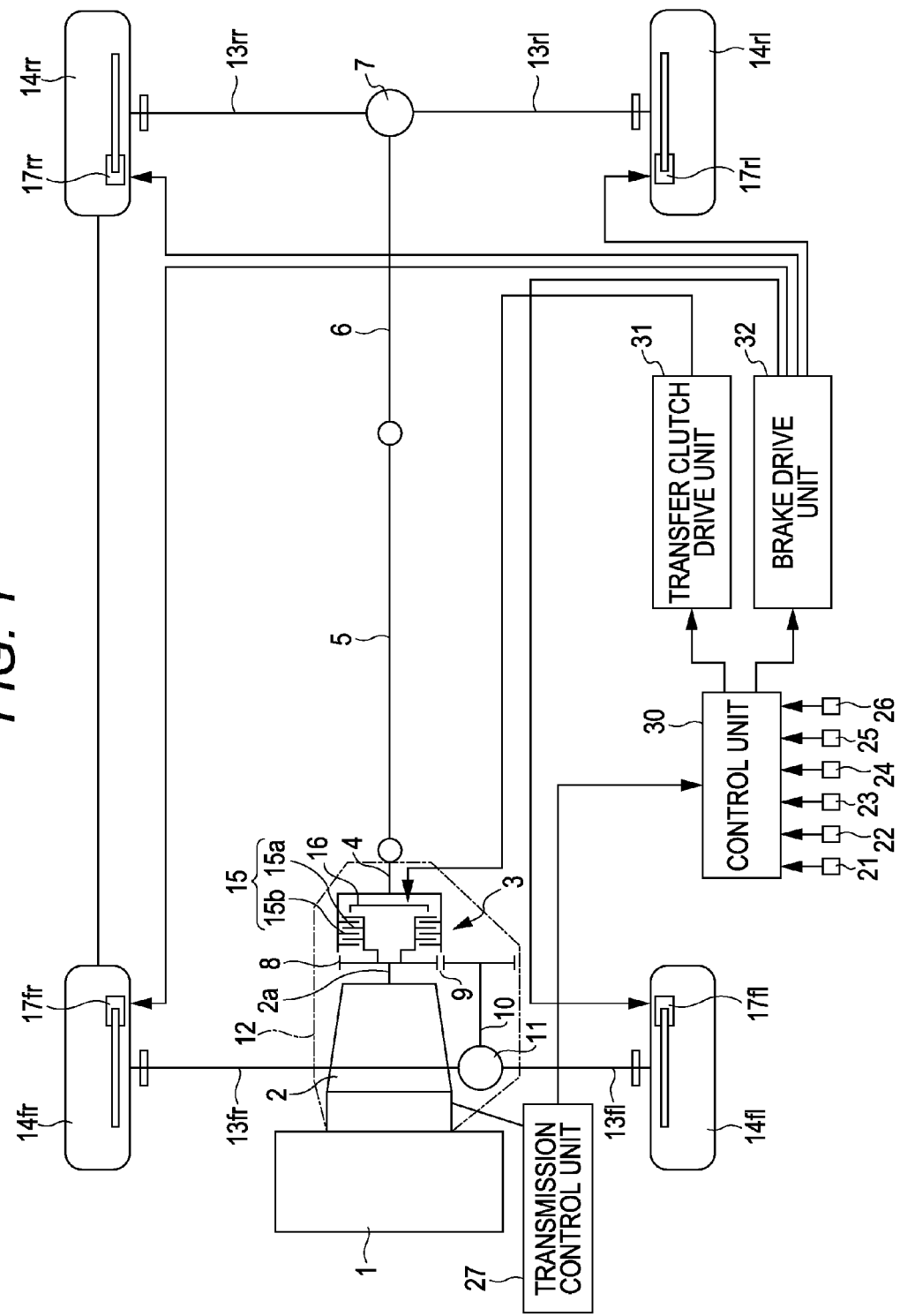
FIG. 1 is an explanatory view illustrating a schematic configuration of an overall vehicle according to an embodiment of the present invention.

In FIG. 1, a driving force from an engine 1, which is arranged at a front part of a vehicle, is transmitted to a transfer 3 from an automatic transmission (it is illustrated as including a torque converter and other components) 2 provided at the rear of the engine 1 via a transmission output shaft 2*a*.

The driving force transmitted to the transfer 3 is input to a rear-wheel final reduction gear unit 7 via a rear drive shaft 4, a propeller shaft 5, and a drive pinion shaft portion 6, while input to a front-wheel final reduction gear unit 11 via a reduction drive gear 8, a reduction driven gear 9, and a front drive shaft 10 serving as a drive pinion shaft portion. The automatic transmission 2, the transfer 3, the front-wheel final reduction gear unit 11 and the like are integrally housed in a case 12.

The driving force input to the rear-wheel final reduction gear unit 7 is transmitted to a rear-left wheel 14*rl* via a rear-wheel left drive shaft 13*rl* and to a rear-right wheel 14*rr* via a rear-wheel right drive shaft 13*rr*. The driving force input to the front-wheel final reduction gear unit 11 is transmitted to a front-left wheel 14*fl* via a front-wheel left drive shaft 13*fl* and to a front-right wheel 14*fr* via a front-wheel right drive shaft 13*fr*.

The transfer 3 includes a wet-type multiple disc clutch (transfer clutch) 15, and a transfer piston 16 that variably applies an engaging force (rear-shaft driving torque) of the transfer clutch 15. The wet-type multiple disc clutch 15, serving as a torque transmission capacity variable clutch, is configured to include drive plates 15a provided near the reduction drive gear 8 and driven plates 15b provided near the rear drive shaft 4, wherein each of the drive plates 15a and each of the driven plates 15h are alternately stacked. Accordingly, the vehicle is a four-wheel vehicle based on a front-engine front-drive-wheel (FF) vehicle that can vary a torque distribution ratio of a front wheel and a rear wheel within a range of, for example, 100:0 to 50:50 by controlling the pressing force of the transfer piston 16 and the engaging force of the transfer clutch 15.

The pressing force of the transfer piston 16 is applied by a transfer clutch drive unit 31 that includes a hydraulic circuit having plural solenoid valves. A later-described control unit 30 outputs a control signal (engaging torque Cawd between front and rear shafts) for driving the transfer clutch drive unit 31.

A brake drive unit 32 of the vehicle has connected thereto a master cylinder (not illustrated) that is connected to a brake pedal operated by a driver. When a driver operates the brake pedal, a brake pressure is applied, by the master cylinder via the brake drive unit 32, to each wheel cylinder (a front-left wheel cylinder 17fl, a front-right wheel cylinder 17fr, a rear-left wheel cylinder 17rl, and a rear-right wheel cylinder 17rr) of each of the four wheels 14fl, 14fr, 14rl, and 14rr, whereby the four wheels are stopped.

The brake drive unit 32 is a hydraulic unit including a pressure-applying source, a pressure-reducing valve, a pressure-increasing valve, and the like. The brake drive unit 32 is configured to be capable of applying the brake pressure independently to each of the wheel cylinders 17fl, 17fr, 17rl, and 17rr according to signals (target brake hydraulic pressures: PBf (inner front-wheel on turn) and PBr (inner rear-wheel on turn)) from the later-described control unit 30, other than performing the above-mentioned brake operation by the driver.

The control unit 30 has connected thereto a vehicle speed sensor 21, a steering angle sensor 22, an accelerator opening degree sensor 23, an engine revolution sensor 24, a lateral acceleration sensor 25, a road friction coefficient estimating device 26, and a transmission control device 27, wherein a vehicle speed V, a steering; angle θH, an accelerator opening degree θp, an engine revolution ωe, a body lateral acceleration $(d'_2y/dt^2)$, a road friction coefficient μ, and a main transmission gear ratio i are respectively input to the control unit 30.

The control unit 30 calculates an engine driving force is Fd based upon these input, signals, calculates the engaging torque Cawd between front and rear shafts through the execution of a first-order lag process based upon the engine driving force Fd, and then, outputs the resultant to the transfer clutch drive unit 31. Further, the control unit 30 calculates, based upon a temporal change of the engine driving force Fd (driving force change amount ΔFd), a braking force Fdtd according to the change of the driving force that decreases with the lapse of time through the execution of a first-order lead process, and then, calculates an acceleration sensitive target yaw moment Mdt based upon the braking force Fdtd according to the change of the driving force. The control unit 30 also calculates a steering sensitive target yaw moment Mst based upon a steering angle velocity through the execution of the first-order lead process. Thereafter, the control unit 30 calculates the braking force (target brake hydraulic pressures: PBf (inner from wheel on turn) and PBr (rear wheel at the inside of the turn)) which are to be added to the inner wheels on the turn based upon the acceleration sensitive target yaw moment Mdt and the steering sensitive target yaw moment Mst, and then, outputs the resultants to the brake drive unit 32. The inner wheel on the turn means a wheel which is in inner side of the turn.

Figure 2:
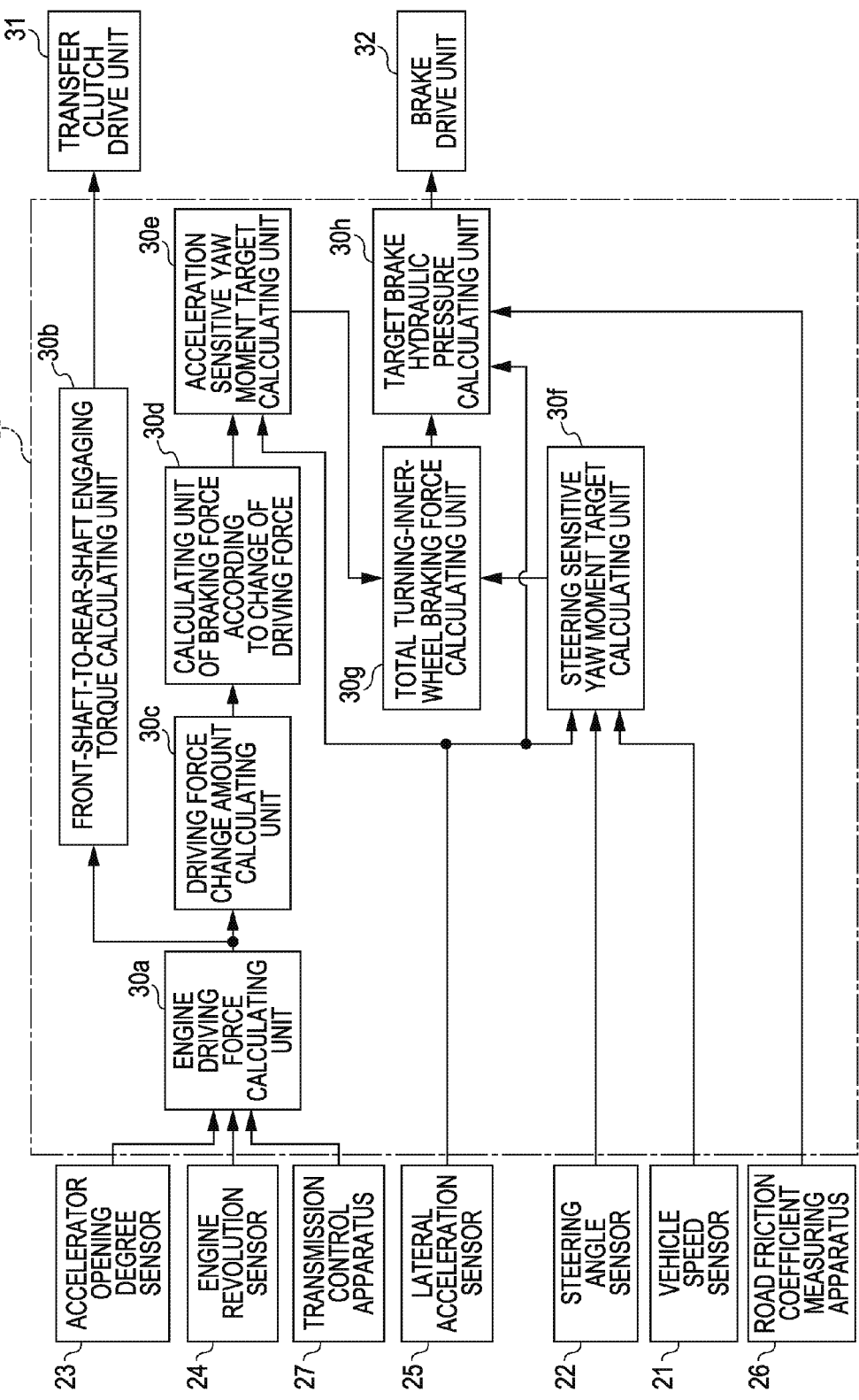
FIG. 2 is a functional block diagram illustrating a control unit according to the embodiment of the present invention.

Therefore, as illustrated in FIG. 2, the control unit 30 is mainly configured to include an engine driving force calculating unit 30a, a front-shaft-to-rear-shaft engaging torque calculating unit 30b, a driving force change amount calculating unit 30c, a calculating unit 30d of the braking force according to the change of the driving force, an acceleration sensitive target yaw moment calculating unit 30e, a steering sensitive target yaw moment calculating unit 30f, a total turning-inner-wheel braking force calculating unit 30g, and a target brake hydraulic pressure calculating unit 30h.

To the engine driving force calculating unit 30a, the accelerator opening degree θp is input from the accelerator opening degree sensor 23, the engine revolution ωe is input from the engine revolution sensor 24, and the main transmission gear ratio i is input from the transmission control device 27. Then, for example, the engine driving force Fd is calculated with an equation (1) described below, and the resultant is output to the front-shaft-to-rear-shaft engaging torque calculating unit 30b, and the driving force change amount calculating unit 30c.

$$Fd = f(\theta p, \omega e) \cdot (i \cdot Gf)/Rt \tag{1}$$

Here, f(θp,ωe) is an engine output torque estimated based upon the accelerator opening degree θp and the engine revolution ωe by referring to a map (engine characteristic map) set beforehand. In the equation, Gf is a final gear ratio, and Rt is a tire diameter.

Alternatively the engine driving force Fd may be calculated according to an equation (1) described below.

$$Fd = f(\upsilon a) \cdot (i \cdot Gf)/Rt \tag{1'}$$

Here, f(υa) is an actual engine output torque that is calculated based upon an intake air amount υa by referring to the map (engine characteristic map) set beforehand. The engine driving force Fd is input to the front-shaft-to-rear-shaft engaging torque calculating unit 30b serving as the actual engine output torque, from the engine driving force calculating unit 30a. The front-shaft-to-rear-shaft engaging torque Cawd is calculated according to an equation (2) described below, for example, and the resultant is output to the transfer clutch drive unit 31.

$$Cawd = (1/(1+Taws \cdot s)) \cdot Fd \cdot Gawd \tag{2}$$

Here, Tawd is a time constant of a low-pass filter (first-order lag filter), s is a Laplace operator, and Gawd is a control gain (predetermined value).

Specifically, the engaging torque Cawd between the front shaft and the rear shaft is set with the first-order lag as represented by the equation (2). Therefore, even when the control amount is set simultaneous with the input of the accelerator opening degree by the driver's operation at a time t2 as illustrated in the example in FIG. 7 of the longitudinal driving force distribution control, for example, the control amount does not increase simultaneous with the input of the accelerator opening; degree as in the conventional longitudinal driving force distribution control (that is not subject to the first-order lag process), but the control amount increases with lag.

The engine driving force Fd is input to the driving; force change amount calculating unit 30c from the engine driving force calculating unit 30a. The driving force change amount calculating unit 30c calculates the temporal change amount (driving force change amount) ΔFd of the engine driving force Fd according so an equation (3) described below for example, and outputs the resultant to the calculating unit 30d of the braking force according to the change of the driving force.

$$\Delta Fd = Fd - (1/(1+Tl \cdot s)) \cdot Fd \tag{3}$$

Here, Tl is a time constant of the low-pass filter, and is a Laplace operator. In the present embodiment, the driving force change amount ΔFd is calculated by the filtering process. However, it may be calculated by subtracting the engine driving force Fd, which is calculated earlier by a predetermined time (e.g., 1 second) than this calculation of the engine driving force Fd, from the engine driving force Fd calculated in this process.

The driving force change amount ΔFd is input to the calculating unit 30c1 of the braking force according to the change of the driving force from the driving force change amount calculating unit 30c. The calculating unit 30d calculates the braking force Fdtd according to the change of the driving force with the use of an equation (4) described below, for example, and outputs the resultant to the acceleration sensitive target yaw moment calculating unit 30e.

$$Fdtd = ((Th \cdot s)/(1+Th \cdot s)) \cdot \Delta Fd \tag{4}$$

Here, Th is a time constant of a high-pass filter (first-order lead filter).

Specifically, the braking force Fdtd according to the change of the driving force is set with the first-order lead as represented by the equation (4) described above. Therefore, when the braking force (braking amount) is set based upon this value, and when the braking force (braking amount) is set simultaneous with the input of the accelerator opening degree by the driver's operation at the time t2 as illustrated in the brake control in FIG. 7, the braking force (braking amount) based upon this value is promptly set, and then, the gradually decreasing control amount is added.

The body lateral acceleration ($d^2y/dt^2$) is input to the acceleration sensitive target yaw moment calculating unit 30e from the lateral acceleration sensor 25, and the braking force Fdtd according to the change of the driving force is input thereto from the calculating unit 30d of the braking force according to the change of the driving force. The acceleration sensitive target yaw moment calculating unit 30e calculates the acceleration sensitive target yaw moment Mdt according to an equation (5) described below, for example, and outputs the resultant to the total turning-inner-wheel braking force calculating is 30g.

$$Mdt = Fdtd \cdot Gc \tag{5}$$

Figure 4:
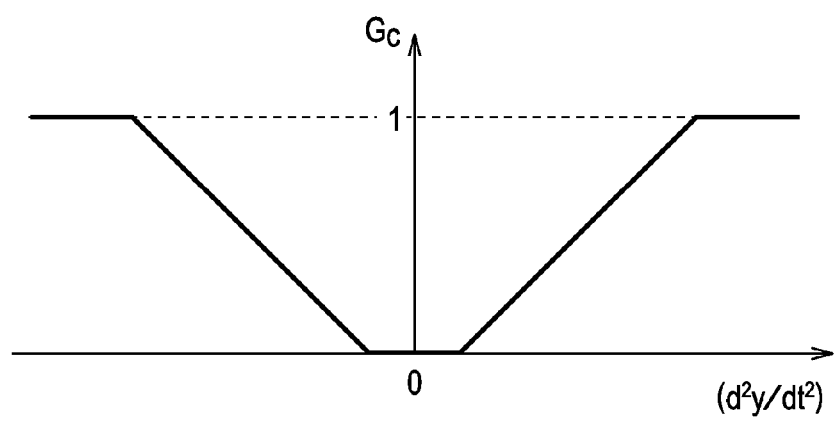
FIG. 4 is a characteristic diagram illustrating a control gain according to a turning state for calculating an acceleration sensitive target yaw moment according to the embodiment of the present invention.

Here, Gc is a control gain according to the turning state, and it is set by referring to the map illustrated in FIG. 4, for example. In the map of the control gain Gc according to the turning state, the control gain Gc according to the turning state is set to be 0 in a region where the body lateral acceleration ($d^2y/dt^2$) (serving as a parameter representing the vehicle turning state) is nearly 0 (the region where the vehicle is running almost straight). Specifically, in the region where the vehicle is running almost straight, it is substantially unnecessary to generate a yaw moment by the brake control in order to correct the vehicle behavior. Therefore, the acceleration sensitive target yaw moment Mdt, which is the basis of the control amount of the brake control, is set to be 0. In the present embodiment, the control gain Gc according to the turning state is set according to the body lateral acceleration ($d^2y/dt^2$), serving as the representative parameter of the turning state of the vehicle. However, the control gain Gc according to the turning state may be set according to a yaw rate serving as the representative parameter of the turning state of the vehicle.

To the steering sensitive target yaw moment calculating unit 30f, the vehicle speed V is input from the vehicle speed sensor 21, the steering angle θH is input from the steering angle sensor 22, and the body lateral acceleration ($d^2y/dt^2$) is input from the lateral acceleration sensor 25. The steering sensitive target yaw moment calculating unit 30f calculates the steering sensitive target yaw moment Mst according to an equation (6) described below, for example, and then, outputs the resultant to the total turning-inner-wheel braking force calculating unit 30g.

$$Mst = (d\theta H/dt) \cdot ((Ts \cdot s)/(1+Ts \cdot s)) GMZV \cdot |(d^2y/dt^2)| \tag{6}$$

Figure 5:
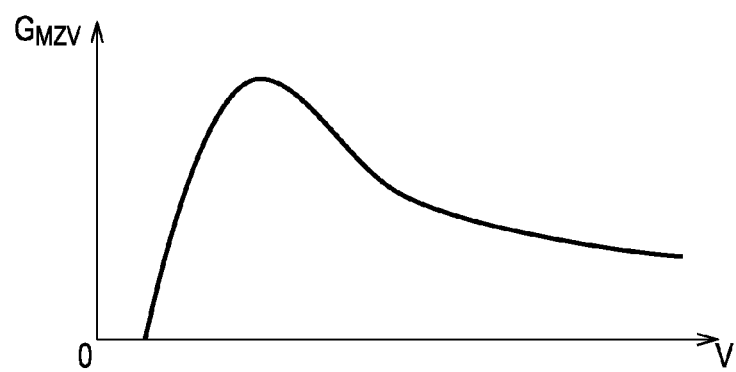
FIG. 5 is a characteristic diagram illustrating a control gain according to a vehicle speed for calculating a steering sensitive target yaw moment according to the embodiment of the present invention.

Here, Ts is a time constant of the high-pass filter (first-order lead filter) ter). Further, GMZV is a control gain according to the vehicle speed, and it is set with reference to the map in FIG. 5, for example. The yaw moment gain GMZV according to the vehicle speed V is set to have a characteristic such that it is set to be nearly 0 in the region where the vehicle speed V is low, while in the region where the vehicle speed is high, it gradually decreases as the vehicle speed V increases. This is based upon the following reason: in the very-low-speed region where the vehicle speed V is nearly 0, it is unnecessary to correct the vehicle behavior by generating the yaw moment with the brake control. Therefore, the characteristic described above is set in order to set the steering sensitive target yaw moment. Mst, which is the reference of the control amount in the brake control, to be 0. Furthermore, the above-mentioned characteristic is set, because it is unnecessary to generate the yaw moment in the brake control so as to enhance steering response of the vehicle, as the vehicle speed V increases.

Figure 7:
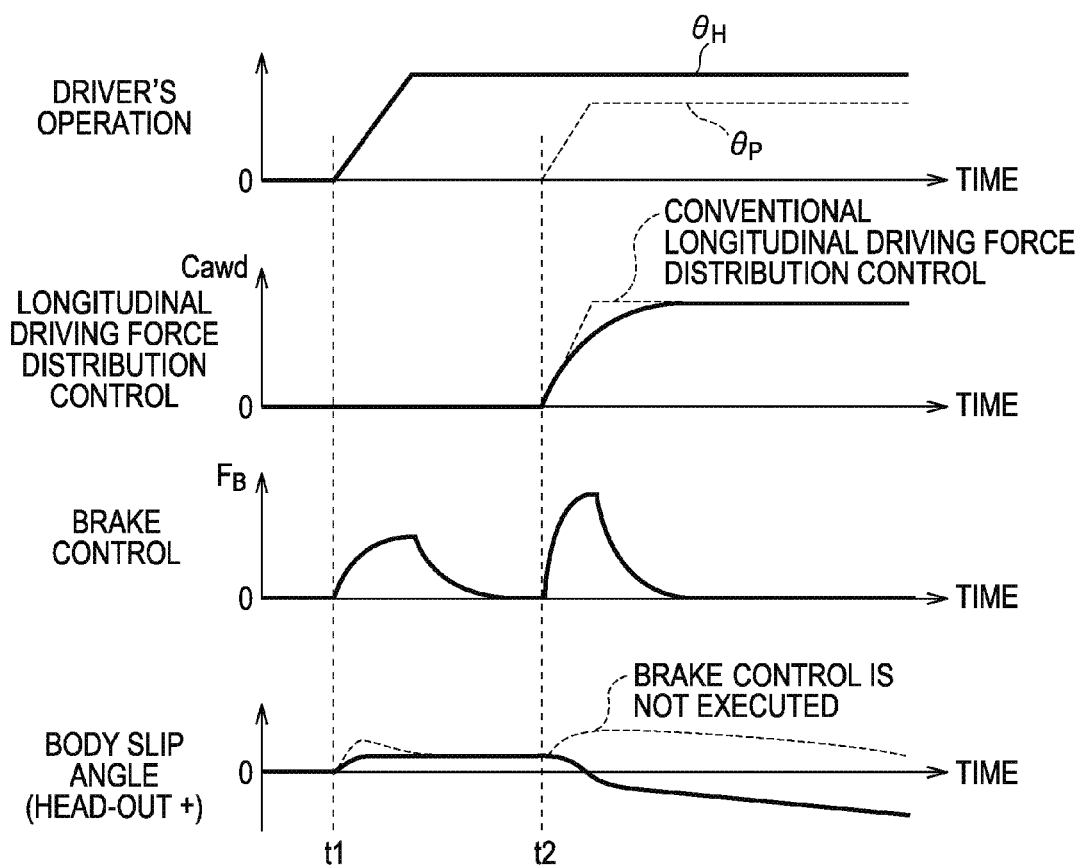
FIG. 7 is a time chart illustrating an example of the vehicle behavior control, according to the embodiment of the present invention.

The steering sensitive target yaw moment Mst is also set with the first-order lead as indicated by the equation (6) described above. Therefore, when the braking force (control amount) is set based upon this value, and when the braking force (control amount) is set simultaneous with the input of the steering angle by the driver's operation at the time t1 in the brake control as illustrated in FIG. 7, the braking force (control amount) based upon this value is promptly set, and then, the gradually decreasing control amount is added.

The acceleration sensitive target yaw moment. Mdt is input to the total turning-inner-wheel braking force calculating unit 30g from the acceleration sensitive target yaw moment calculating unit 30e, and the steering sensitive target yaw moment Mst is input, thereto from the steering sensitive target yaw moment calculating unit 30f. The total turning-inner-wheel braking force calculating unit 30g calculates the total braking force FB of the wheels at the inside of the turn according to an equation (7) described below, for example, and then, outputs the resultant to the target brake hydraulic pressure calculating unit 30h.

$$FB = FBf + FBr = 2 \cdot (Mdt + Mst)/w \tag{7}$$

Here, FBf is the braking force of the inner front wheel on turn, and FBr is the braking force of the inner rear wheel on the turn, those of which will be explained in the description for the target brake hydraulic pressure calculating unit 30h.

To the target brake hydraulic pressure calculating unit 30h, the body lateral acceleration ($d^2y/dt^2$) is input from the lateral acceleration sensor 25, the road friction coefficient μ is input from the road friction coefficient estimating device 26, and the total braking force FB of the inner wheels on the turn is input from the total turning-inner-wheel braking force calculating unit 30g. The target brake hydraulic pressure calculating unit 30h calculates the braking; forces FBf and FBr of the inner front and rear wheels on the turn according to equations (8) and (9) described below so as to calculate the braking forces PBf and PBr of the inner front and rear wheels on the turn according to equations (10) and (11) described below, and then, outputs the resultant to the brake drive unit 32

$$FBf = FB \cdot DB \quad (8)$$

$$FBr = FB \cdot (1 - DB) \quad (9)$$

Figure 6:
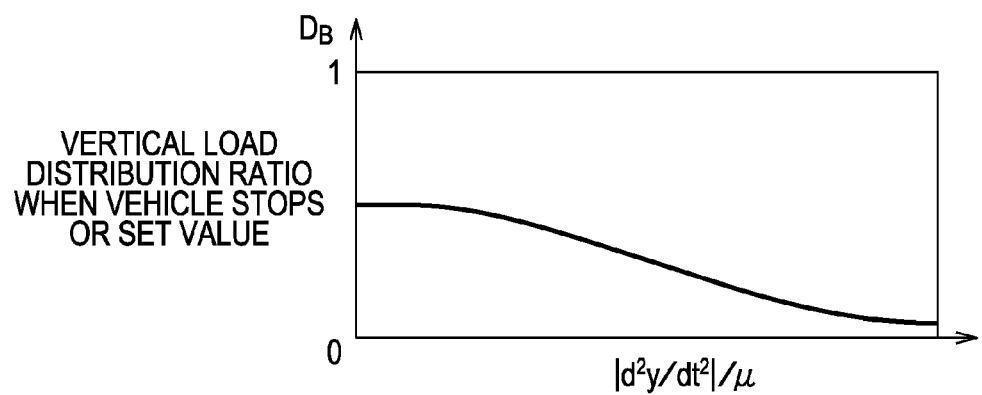
FIG. 6 is an explanatory view illustrating one example of a longitudinal braking force distribution of an inner wheel on a turn according to the embodiment of the present invention.

Here, DB is a longitudinal distribution ratio of the braking forces of the inner wheels on the turn, which is set by referring to a map prepared beforehand, as illustrated in FIG. 6 for example. In the present embodiment the longitudinal distribution ratio DB of the braking forces of the inner wheels on the turn is set as described below in the present embodiment as follows: as a grip state of a tire approaches the limit (i.e., $|d^2y/dt^2|/\mu$ increases), the longitudinal distribution ratio DB of the braking forces is decreased from a value near the vertical load distribution ratio during when the vehicle stops. The characteristic of the longitudinal distribution ratio DB of the braking forces of the inner wheels on the turn is not limited to that described above.

$$PBf = FBf \cdot KBf \quad (10)$$

$$PBr = FBr \cdot KBr \quad (11)$$

Here, KBf and KBr are constants determined by brake specifications (such as wheel cylinder diameter).

Figure 3:
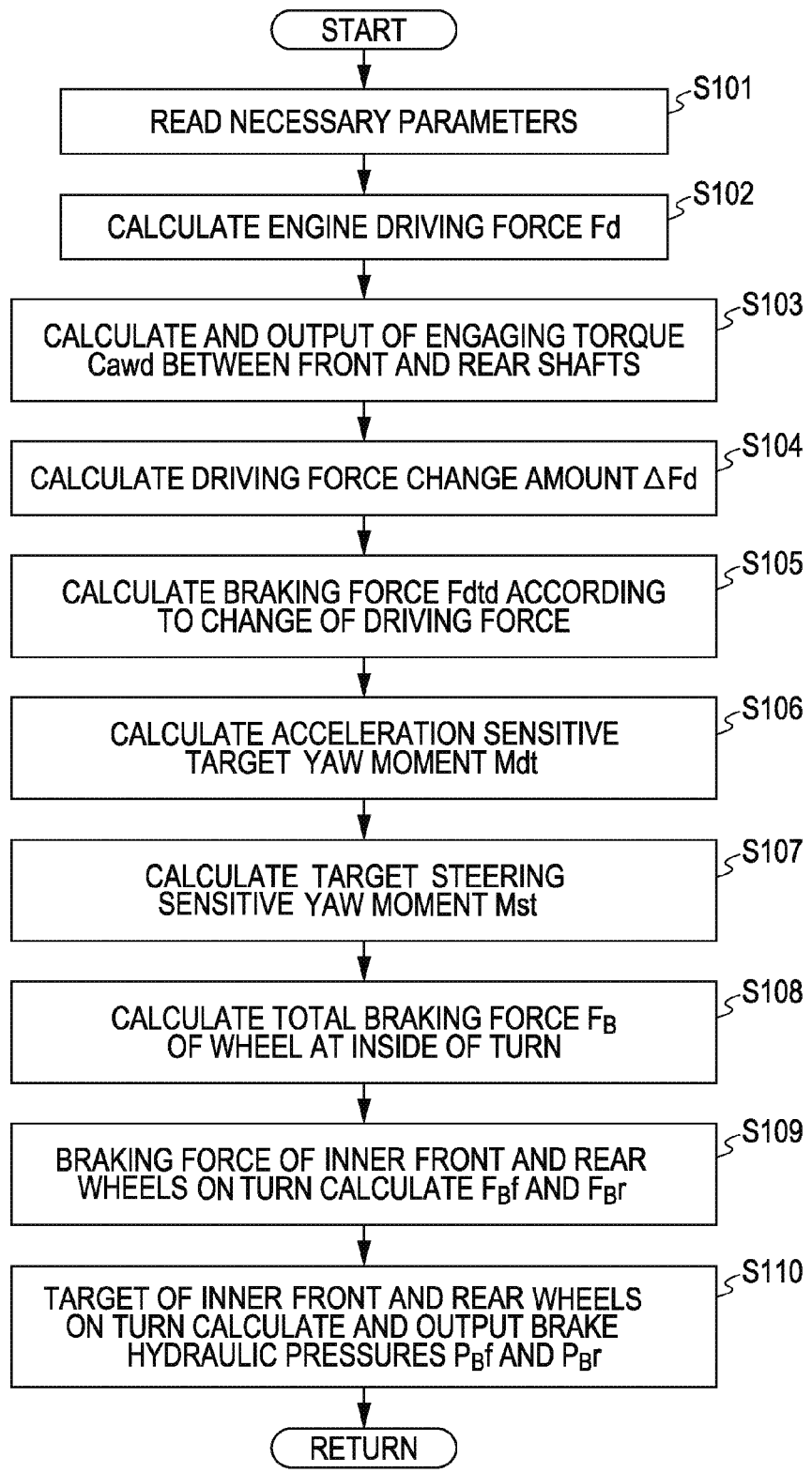
FIG. 3 is a flowchart illustrating a vehicle behavior control program according to the embodiment of the present invention.

A vehicle behavior control program executed by the control unit 30 described above will be described with reference to a flowchart in FIG. 3.

Firstly, in step (hereinafter simply referred to as S) S101, the control unit 30 reads necessary parameters, that is the vehicle speed V, the steering angle θH, the accelerator opening degree θp, the engine revolution ωe, the body lateral acceleration $(d^2y/dt^2)$, the road friction coefficient μ, and the main transmission gear ratio i.

Then, the control unit 30 proceeds to 3102 where the engine driving force calculating unit 30a calculates the engine driving force Fd according to the equation (1) or (1').

Thereafter, the control unit 30 proceeds to S103 where the front-shaft-to-rear-shaft engaging torque calculating unit 30b calculates the engaging torque Cawd between the front shaft and the rear shaft according to the equation (2), and outputs the resultant to the transfer clutch drive unit 31.

The control unit 30 then proceeds to S104 where the driving force change amount calculating unit 30c calculates the temporal change amount (the driving force change amount) ΔFd0 of the engine driving force Fd according to the equation (3).

The control unit 30 then proceeds to S105 where the calculating unit 30c1 of the braking force according to the change of the driving force calculates the braking force Fdtd according to the change of the driving force according to the equation (4).

Subsequently, the control unit 30 proceeds to S106 where the acceleration sensitive target yaw moment calculating unit 30e calculates the acceleration sensitive target yaw moment Mdt according to the equation (5).

The control unit 30 then proceeds to S107 where the steering sensitive target yaw moment calculating unit 30f calculates the steering sensitive target yaw moment Mst according to the equation (6).

Next, the control unit 30 proceeds to S108 where the total is turning-inner-wheel braking force calculating unit 30e calculates the total braking force FB of the inner wheels on the turn according to the equation (7).

Then, the control unit 30 proceeds to S109 where the target brake hydraulic pressure calculating unit 30h calculates the braking forces FBf and FBr of the inner front and rear wheels on the turn according to the equations (8) and (9).

The control unit 30 then proceeds to S110 so as to calculate the braking forces PBf and PBr of the inner front and rear wheels on the turn according to the equations (10) and (11), and outputs the resultant to the brake drive unit 32. Then, the control unit 30 exits the program.

An example of the vehicle behavior control executed as described above according to the present embodiment will be described with reference to the time chart in FIG. 7. This time chart illustrates an example in which a driver makes a steering at the time t1, and then, depresses the accelerator pedal at the time t2.

Therefore, at the time t1 when the driver makes the steering input, the braking force of the inner wheels on the turn based upon the steering sensitive target yaw moment Mst, which is calculated according to the equation (6), is set and output with the first-order lead.

Conventionally, the vehicle behavior having a certain body slip angle (in this example, in the slightly head-out direction) is produced as indicated by a broken line in FIG. 7 by the steering input at the time t1. However, the vehicle behavior is corrected in the head-in direction as indicated by a solid line in FIG. 7 because of the addition of the braking force to the inner wheels on the turn according to the steering sensitive target yaw moment Mst described above. (In this example, it is supposed that there is no change in the longitudinal driving force distribution control due to the steering input.

When the driver executes the acceleration input at the time t2 in this state, the engaging torque Cawd between the front shaft and the rear shaft calculated with the equation (2) is output in the longitudinal driving force distribution control. As described above, the engaging torque Cawd between the front shaft and the rear shaft is set with toe first-order lag in the present embodiment. Therefore, even when the control amount is set simultaneous with the input of the accelerator opening degree by the driver's operation at the time t2, the control amount does not increase with the accelerator opening degree as in the conventional longitudinal driving force distribution control (wherein the first-order lag process is not executed), but the control amount increases with lag.

At the time t2, the braking force of the inner wheels on the turn according to the acceleration sensitive target yaw moment Mdt calculated with the equations (4) and (5) is set and output with the first-order lead.

Therefore, firstly the vehicle behavior is corrected in the head-in direction as indicated by the solid line in FIG. 7, because of the addition of the braking force to the inner wheels on the turn according to the acceleration sensitive target yaw moment Mdt by the brake control. Thereafter, the transfer clutch 15 is engaged, whereby the conventional tendency of promoting the head-out is prevented. Accordingly, the turning performance desired by the driver can be achieved.

According to the embodiment of the present invention, the engine driving force Fd is calculated, and the first-order lag process is executed based upon the engine driving force Fd so as to calculate the engaging torque Cawd between the front shaft and the rear shaft. The resultant is output to the transfer clutch drive unit 31. The braking force Fdtd according to the change of the driving force, which decreases with the lapse of time, is calculated with the first-order lead process based upon the temporal change of the engine driving force Fd (the change amount ΔFd of the driving force). Then, the acceleration sensitive target yaw moment Mdt is calculated based upon the braking force Fdtd according to the change of the driving force, and the steering sensitive target yaw moment Mst based upon the steering angle velocity is calculated with the first-order lead process. The braking forces (target brake hydraulic pressures: PBf (the inner front wheel on the turn) and PBr (the inner rear wheel on the turn)), which are to be added to the braking forces to the inner wheels on the turn, are calculated based upon the acceleration sensitive target yaw moment Mdt and the steering sensitive target yaw moment Mst, and the resultant is output to the brake drive unit 32. Since the transfer clutch 15 is engaged while transferring the vehicle to the predetermined head-in state by the brake control, steering response and traction performance can appropriately be attained by the cooperation of the longitudinal driving force distribution control and the brake control.

What is claimed is:

1. A vehicle behavior control apparatus comprising:
   a longitudinal driving force distribution control unit configured to control a driving force distribution between front wheels and rear wheels according to a vehicle motion state; and
   a braking force control unit configured to add a braking force to a wheel that is set according to a driving state of the vehicle, wherein
   the control of the driving force distribution by the longitudinal driving force distribution control unit is executed later than the addition of the braking force by the braking force control unit.

2. The vehicle behavior control apparatus according to claim 1, wherein the longitudinal driving force distribution control unit calculates the engaging torque between the front shaft and the rear shaft by performing a lag process to the engaging torque between the front shaft and the rear shaft.

3. The vehicle behavior control apparatus according to claim 1, wherein the braking force control unit calculates the braking force, which is to be added to the wheel, by performing a lead process thereto.

4. The vehicle behavior control apparatus according to claim 2, wherein the braking force control unit calculates the braking force, which is to be added to the wheel, by performing a lead process thereto.

5. The vehicle behavior control apparatus according to claim 1, wherein the engaging torque between the front shaft and the rear shaft calculated by the longitudinal driving force distribution control unit and the braking force calculated by the braking force control unit are calculated according to at least the driving force of the vehicle.

6. The vehicle behavior control apparatus according to claim 1, wherein the braking force calculated by the braking force control unit is calculated based upon a temporal change of the driving force and a steering change during a turn.

7. The vehicle behavior control apparatus according to claim 1, wherein the wheel to which the braking force control unit adds the braking force is an inner wheel on the turn.

8. The vehicle behavior control apparatus according to claim 1, wherein the braking force calculated by the braking force control unit is calculated by the execution of a damping process according to time.

* * * * *